(12) United States Patent
Kim et al.

(10) Patent No.: US 8,043,765 B2
(45) Date of Patent: Oct. 25, 2011

(54) FUEL CELL SYSTEM COMPRISING VAPOR-PHASE FUEL SUPPLYING SYSTEM

(75) Inventors: Hae-Kyoung Kim, Seoul (KR); Jung-Min Oh, Yongin-si (KR); Jae-Yong Lee, Seongnam-si (KR); Hyuk Chang, Seongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1033 days.

(21) Appl. No.: 11/420,169

(22) Filed: May 24, 2006

(65) Prior Publication Data

US 2006/0269825 A1    Nov. 30, 2006

(30) Foreign Application Priority Data

May 25, 2005  (KR) .......... 10-2005-0044252
May 10, 2006  (KR) .......... 10-2006-0041965

(51) Int. Cl.
H01M 8/22   (2006.01)
H01M 8/10   (2006.01)
H01M 8/04   (2006.01)

(52) U.S. Cl. ......... 429/506; 429/483; 429/490; 429/513

(58) Field of Classification Search .......... 429/41, 429/30, 23, 42
See application file for complete search history.

(56) References Cited

U.S. PATENT DOCUMENTS

| | | | |
|---|---|---|---|
| 6,428,722 B1 * | 8/2002 | Furuya .......... | 252/510 |
| 2003/0008193 A1 * | 1/2003 | Kinkelaar et al. .......... | 429/39 |
| 2004/0209136 A1 | 10/2004 | Ren et al. | |
| 2004/0209154 A1 | 10/2004 | Ren et al. | |

FOREIGN PATENT DOCUMENTS

CN   1288490    3/2001

OTHER PUBLICATIONS

Chinese Office Action dated Feb. 29, 2008.

* cited by examiner

*Primary Examiner* — Ula C. Ruddock
*Assistant Examiner* — Thomas H. Parsons
(74) *Attorney, Agent, or Firm* — H.C. Park & Associates, PLC

(57) ABSTRACT

A fuel cell system is provided with a first separation layer and a buffer solution layer disposed between a liquid-phase fuel storage layer and an anode of a membrane electrode assembly. A vapor-phase fuel is transferred to the buffer solution layer through the first separation layer, condensed, and diluted to produce a liquid-phase fuel with a low concentration in the buffer solution layer, and the low concentration liquid-phase fuel is supplied to the membrane electrode assembly. A second separation layer may be interposed between the first separation layer and the fuel storage layer. Fuel is supplied by a passive supplying method so that the system can be small with a high efficiency and unnecessary power consumption can be prevented. The fuel cell system can be operated regardless of orientation.

33 Claims, 6 Drawing Sheets

FUEL CELL SYSTEM COMPRISING VAPOR-PHASE FUEL SUPPLYING SYSTEM

CROSS-REFERENCE TO RELATED APPLICATIONS

This application claims priority to and the benefit of Korean Patent Application No. 10-2005-0044252, filed on May 25, 2005 and Korean Patent Application No. 10-2006-0041965, filed on May 10, 2006, which are hereby incorporated by reference for all purposes as if fully set forth herein.

BACKGROUND OF THE INVENTION

1. Field of the Invention

The present invention relates to a fuel cell system, and more particularly, to a fuel cell system with a high energy density and a compact size.

2. Discussion of the Background

A fuel cell is an energy generating system in which energy from a chemical is reaction is directly converted to electrical energy. The chemical reaction may be between hydrogen and oxygen, or between hydrogen contained in a hydrocarbon-based material such as methanol, ethanol, or natural gas, and oxygen. Fuel cells can be categorized as phosphoric acid type fuel cells, molten carbonate type fuel cells, solid oxide type fuel cells, polymer electrolyte membrane fuel cells, alkali type fuel cells, for example, according to the type of electrolyte that is used as a fuel. Most of these fuel cells operate upon the same principle, but may have different fuels, different operating temperatures, different catalysts, or different electrolytes.

Among these fuel cells, the polymer electrolyte membrane fuel cell (PEMFC) may have better output properties, lower operating temperature, shorter start-up time, and a quicker response than other fuel cells. Due to these advantages, the PEMFC may be used for a wide range of applications, including a portable power source for cars, an individual power source for homes or public buildings, and a small power source for electronic devices.

A direct methanol fuel cell (DMFC), which is a type of PEMFC, uses an aqueous methanol solution as a fuel. The DMFC can operate at room temperature and can be easily reduced in size and sealed so that it can be used as an energy-supplying source for various applications, such as clean electric vehicles, domestic energy generating systems, mobile communications equipment, medical equipment, military equipment, space business equipment, and portable electronics, for example.

The electric power generated from the DMFC is dependent upon the rate of the reaction occurring in an anode and a cathode. Specifically, in the anode, one molecule of methanol reacts with one molecule of water so that the methanol is oxidized. Carbon dioxide and six electrons are generated from the reaction, as illustrated in Reaction Scheme 1.

$$CH_3OH + H_2O \rightarrow CO_2 + 6H^+ + 6e^-$$ [Reaction Scheme 1]

In the anode reaction shown in Reaction Scheme 1, the stoichiometry of the methanol to water is 1:1. Therefore, to continuously generate the anode reaction shown in Reaction Scheme 1, a DMFC should be constantly supplied with reactants in the proper ratio. However, in reality, more water is supplied than that amount required to completely oxidize the methanol. When the methanol is incompletely oxidized, reactions shown in Reaction Scheme 2 or Reaction Scheme 3 may occur, thus reducing energy generating efficiency.

$$CH_3OH + H_2O \rightarrow HCOOH + 4H^+ + 4e^-$$ [Reaction Scheme 2]

$$CH_3OH \rightarrow HCHO + 2H^+ + 2e^-$$ [Reaction Scheme 3]

Methods of supplying a fuel to a DMFC may include an active supplying method and a passive supplying method. The active supplying method requires an external supplying unit that transports fuel to the DMFC under pressure. The passive supplying method includes supplying fuel without such pressure transport equipment.

In the active supplying method, the concentration of a reacting fluid supplied to an anode is appropriately maintained by supplying pure methanol or a high-concentration is methanol to a recirculation loop, which collects water generated by the reaction in a cathode and supplies the collected water to the anode. An advantage of the active supplying method is that the energy density of the entire system increases by using a methanol cartridge. A disadvantage of the active supplying method, however, is that the system is complex, the requirement for additional devices results in an increase in size of the DMFC, and additional power may be consumed since an external supplying system consumes energy for its operation. More particularly, since fuel cells are becoming smaller, the active supplying method has a disadvantage in that the necessary power-supplying source is also required to become smaller.

Conversely, a significant advantage of the passive supplying method is that it is a simple system. However, one disadvantage to the passive supplying method is that a fuel cartridge may contain water as well as the methanol fuel. Therefore, the volume of this fuel cartridge may increase the total volume of the fuel cell.

This problem has been addressed by supplying water generated in a cathode using the passive supplying method, an example of which is disclosed in U.S. Patent Application Publication No. 2004-209136. There, a hydrophobic microporous layer may be formed in a cathode of a membrane-electrode assembly, and water generated in the cathode can be transported to the anode by hydrostatic pressure.

However, in such a system, a unit cell formed of multiple layers may be damaged by the hydrostatic pressure. In addition, U.S. Patent Application Publication No. 2004-209136 does not teach a stable supply and dilution of methanol used as fuel.

SUMMARY OF THE INVENTION

This invention provides a fuel cell system with high energy density and system is efficiency, and with a compact size for use as a small, compact power supplying source.

The present invention discloses a fuel cell system including a membrane electrode assembly including a cathode, a proton conductive membrane, and an anode, a buffer solution layer facing a surface of the anode and containing liquid-phase water generated in the cathode, the buffer solution layer for condensing a vapor-phase fuel into a liquid-phase fuel, a first separation layer facing a surface of the buffer solution layer, and a fuel storage layer facing a surface of the first separation layer and storing a fuel for use in the fuel cell system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
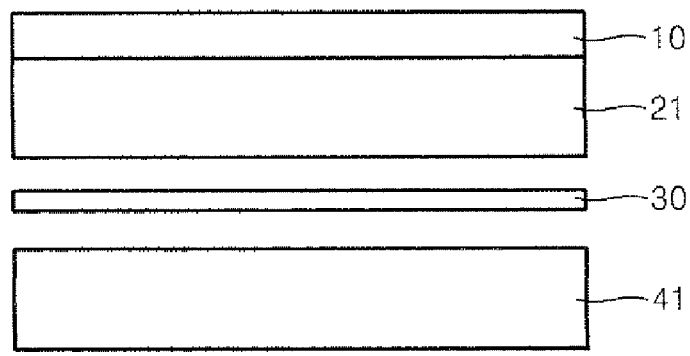
FIG. 1 shows a schematic view of elements of a fuel cell system according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Specifically, dimensions of the fuel cell system illustrated in the figures are exaggerated to facilitate understanding. Like reference numerals in the drawings denote like elements.

It will be understood that when an element such as a layer, film, region or is substrate is referred to as being "on" another element, it can be directly on the other element or intervening elements may also be present. In contrast, when an element is referred to as being "directly on" another element, there are no intervening elements present.

FIG. 1 shows a schematic view of elements of a fuel cell system according to an exemplary embodiment of the present invention. A fuel supplying system according to an exemplary embodiment of the present invention includes a membrane electrode assembly 10, a buffer solution layer 21, a first separation layer 30, and a fuel storage layer 41 as shown in FIG. 1. The buffer solution layer 21 faces an anode surface of the membrane electrode assembly 10. The first separation layer 30 faces a surface of the buffer solution layer 21 and a surface of the fuel storage layer 41.

A fuel may be stored in a liquid state in the fuel storage layer 41. When the fuel supplying system is activated, the liquid-phase fuel vaporizes and diffuses through the first separation layer 30. The fuel storage layer 41 can be physically separated from the first separation layer 30 to prevent liquid-phase fuel from flowing through the first separation layer 30 to the buffer solution layer 21.

Hence, the liquid-phase fuel stored in the fuel storage layer 41 is converted into a vapor-phase fuel, and then the vapor-phase fuel diffuses through the first separation layer 30 to the buffer solution layer 21.

If the liquid-phase fuel flows to the buffer solution layer 21, an excessive quantity of fuel may be supplied to the buffer solution layer 21. An excessive supply of fuel is not desirable because a high concentration of fuel may cause undesirable effects such as rapid poisoning of catalysts or methanol crossover.

The fuel storage layer 41 may include a liquid-phase fuel having a free surface, or is may be formed so a liquid-phase fuel is uniformly distributed in a porous medium. The porous medium may be a foam so that the liquid-phase fuel is stable in its storage regardless of the orientation of the entire system. However, the structure of the fuel storage layer 41 is not limited thereto. When the liquid-phase fuel is uniformly distributed in a porous medium, the fuel can be stably supplied to the buffer solution layer 21 regardless of the orientation or structure of the fuel supplying system.

Figure 4:
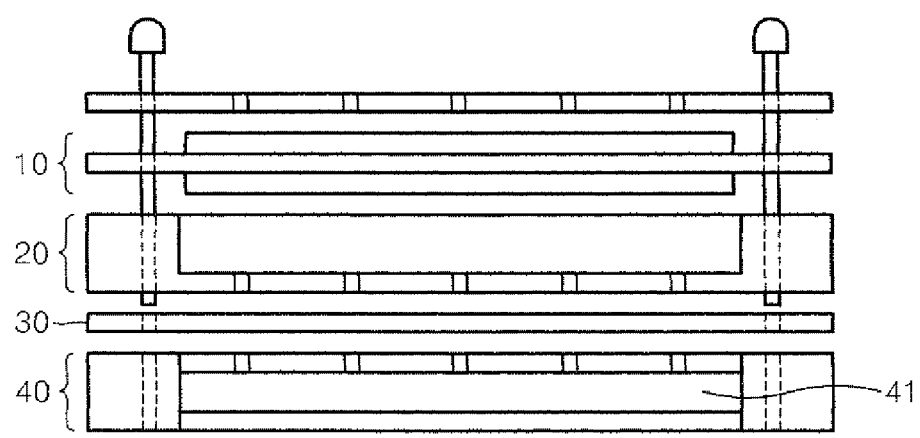
FIG. 4 shows a cross-sectional view of a fuel cell system according to an exemplary embodiment of the present invention.
Figure 5:
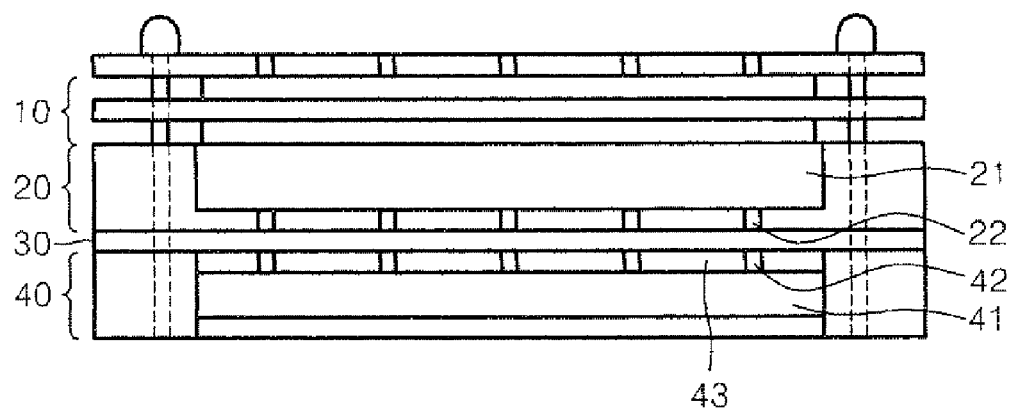
FIG. 5 shows a cross-sectional view of a fuel cell system according to an exemplary embodiment of the present invention.

In addition, the fuel storage layer 41 may be housed in a fuel cartridge 40 as shown in FIG. 4 for ease of handling. An upper portion of the fuel cartridge 40 may face a surface of the first separation layer 30, and the fuel cartridge 40 may have openings 42, as shown in FIG. 5, through which the vaporized fuel may pass.

Figure 9:
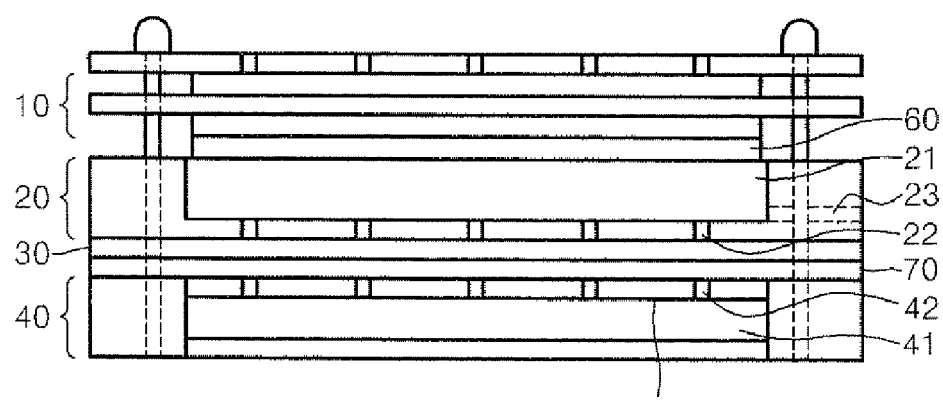
FIG. 9 shows a cross-sectional view of a fuel cell system including a liquid transferring medium according to another exemplary embodiment of the present invention.

Furthermore, a liquid transferring medium 70, as shown in FIG. 9, may be further formed between the fuel cartridge 40 and the first separation layer 30. The liquid transferring medium 70 may be any material that allows liquid to pass through more quickly than gas. The liquid transferring medium 70 may be formed in a thin membrane between the fuel cartridge 40 and the first separation layer 30.

The type of fuel is not limited and may be any material that reacts with water in an anode to generate electrons and protons. The fuel may be, but is not limited to, hydrogen, methanol, ethanol, other hydrocarbon material, a mixture of these materials, or an aqueous solution of these materials. When the fuel cell system according to the present exemplary embodiment of the present invention is a direct methanol fuel cell (DMFC), the fuel may be pure methanol or an aqueous high-concentration methanol solution. An aqueous high-concentration methanol solution refers to an aqueous methanol solution with a concentration of about 5 M or higher.

The first separation layer 30 transfers the vapor-phase fuel to the buffer solution layer 21, and blocks the water in the buffer solution layer 21 from flowing into the fuel storage layer 41. A material for forming the first separation layer 30 is not limited, and may be any material that allows the fuel to pass through more quickly than water, and may be or may include a microporous element or a porous layer formed of products sold under the product names and trademarks Nafion® 112, 115, or 117, or Teflon®, but is not limited thereto. The diffusion coefficient of methanol through the first separation layer 30 may be at least three times greater than the diffusion coefficient of water through the first separation layer 30. When the diffusion coefficient of methanol through the first separation layer 30 is less than three times the diffusion coefficient of water through the first separation layer 30, water may flow into the fuel storage layer 41.

Where the first separation layer 30 is formed of a microporous element, diameters of pores may be in the range of about 0.001 μm to about 50 μm. The distribution of pore diameter in the first separation layer 30 may be bimodal. For example, a first peak of the bimodal distribution may be between about 0.001 μm and about 0.05 μm, and a second peak of the bimodal distribution may be between about 1 μm and about 50 μm. Alternatively, the first separation layer 30 may have a stack structure of a first layer with an average pore size of about 0.001 μm to about 0.05 μm in diameter and a second layer with an average pore size of about 1 μm to about 50 μm in diameter.

When the average diameter of the pores of the first separation layer 30 is less than about 0.001 μm, it may be difficult for the fuel to pass through the first separation layer 30. When the average diameter of the pores of the first separation layer 30 exceeds about 50 μm, high-concentration fuel may diffuse too quickly, thus decreasing the efficiency of the electrode, and water may flow into the fuel storage layer 41. Therefore, it may be difficult to maintain the preferred concentration of the fuel in the buffer solution layer 21.

The thickness of the first separation layer 30 may be in the range of about 1 μm to about 500 μm. When the thickness of the first separation layer 30 is less than about 1 μm, the first separation layer 30 may be easily broken and cautious handling thereof may be required. When the thickness of the first separation layer 30 is greater than about 500 μm, it may be difficult to transfer the fuel through the thickness of the first separation layer 30, and the performance of the fuel cell system may decrease.

As described above, the first separation layer 30 may be separated from the buffer solution layer 21. When the first separation layer 30 is separated from the buffer solution layer 21, the transfer of liquid-phase water contained in the buffer solution layer 21 to the fuel storage layer 41 through the first separation layer 30 may be prevented. If liquid-phase water reaches the fuel storage layer 41, the concentration of the fuel may decrease, thus disturbing the balance of the fuel supply. As a result, the entire system may become unstable.

Generally, methanol that is used as a fuel for a DMFC is diluted before supplied to a membrane electrode assembly 10. When a high concentration of methanol is supplied, a catalyst may be quickly poisoned. This may occur when insufficient water is present to prevent the adsorption of CO, which may be generated when methanol is oxidized, onto the catalyst of an electrode. In addition, when a high concentration of methanol is supplied, non-reacted methanol may cross the membrane of the membrane electrode assembly 10, which may reduce the efficiency of the entire fuel system and a catalyst of the cathode may be poisoned.

In order to supply a low concentration of an aqueous fuel solution, the buffer solution layer 21 is formed. The buffer solution layer 21 converts a vapor-phase fuel, after is transferring through the first separation layer 30, into a liquid phase to form a low-concentration fuel mixture.

The vapor-phase fuel introduced into the buffer solution layer 21 by diffusion may collide with a liquid surface of the buffer solution layer 21, so that the vapor-phase fuel is converted into a liquid-phase fuel. Therefore, the buffer solution layer 21 may contain the vapor-phase fuel and the liquid-phase water generated in a cathode.

The buffer solution layer 21 may contain pure water or a low-concentration fuel mixture when the fuel cell system starts up. Because the diffusion of fuel from the fuel storage layer 41 to the membrane electrode assembly 10 may require a relatively long time, a low concentration fuel mixture, rather than pure water, may be preferred for use during the start-up operation of the fuel cell system.

The buffer solution layer 21 may include a liquid with a free surface, or may be formed such that an aqueous fuel solution in a liquid state is uniformly distributed in a porous medium. However, the buffer solution layer 21 is not limited thereto. When the liquid-phase fuel solution is uniformly distributed in a porous medium, the fuel may be stably supplied regardless of the orientation of the entire system.

Figure 6:
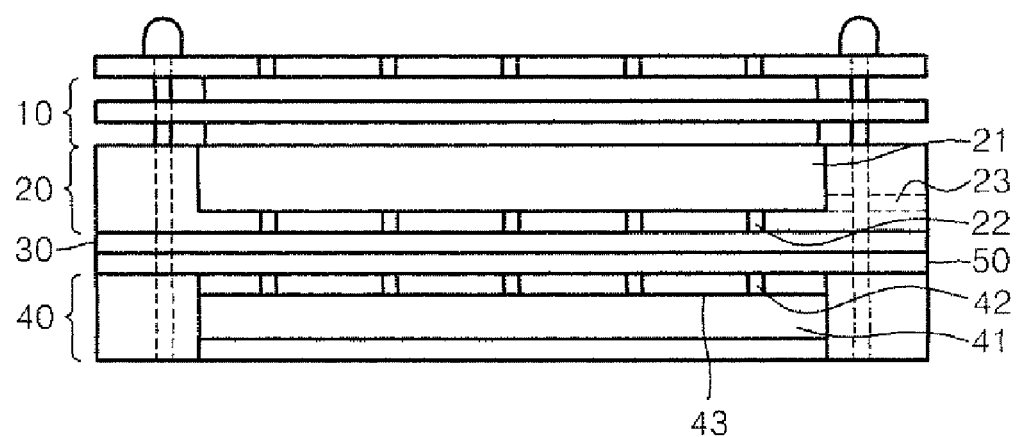
FIG. 6 shows a cross-sectional view of a fuel cell system according to another exemplary embodiment of the present invention.

In addition, the buffer solution layer 21 may be housed in a buffer solution cartridge 20, as shown in FIG. 5, for ease of handling. An upper portion of the buffer solution cartridge 20 may be completely open so the housed buffer solution layer 21 sufficiently contacts a surface of the anode of the membrane electrode assembly 10, and a lower portion of the buffer solution cartridge 20 may have openings 22 so the fuel passing through the first separation layer 30 also transfers smoothly to the buffer solution layer 21. Furthermore, the buffer solution cartridge 20 may have a $CO_2$ vent 23 as shown in FIG. 6, so that $CO_2$ generated by the chemical reaction in the anode can be vented.

The porous medium used to form the buffer solution layer 21 may be hydrophilic. The diametric distribution of pores of the porous medium may be broad or bimodal because the buffer solution layer 21 may both supply fuel and vent $CO_2$.

Although small pores may be favored to supply an aqueous fuel solution via a strong capillary pressure, it may be difficult to discharge $CO_2$ through uniformly distributed small pores. However, even though $CO_2$ may be easily discharged through large pores, large pores have relatively low capillary pressure compared with small pores and may not develop strong capillary pressure to supply an aqueous fuel solution. In consideration of such properties of small and large pores, a first peak of the bimodal distribution may be between about 1 nm and about 10 μm and a second peak of the bimodal distribution may be between about 10 μm and about 10 mm.

The porous medium used to form the buffer solution layer 21 may be an inorganic oxide material, a polymer material or a compound thereof, but is not limited thereto.

The inorganic oxide material may be silica ($SiO_2$), alumina ($Al_2O_3$), titania ($TiO_2$), zirconia ($ZrO_2$), or a compound thereof, but is not limited thereto.

The polymer material may be a polymer resin including a hydroxyl group, a carboxyl group, an amine group or a sulfone group, a polyvinylalcohol-based polymer resin, a cellulose-based polymer resin, a polyvinylamine-based polymer resin, a polyethylene oxide-based polymer resin, a polyethyleneglycol-based polymer resin, a nylon-based polymer resin, a polyacrylate-based polymer resin, a polyester-based polymer resin, a polyvinylpyrrolidone-based polymer resin, an ethylenevinylacetate-based polymer resin, a polyethylene-based polymer resin, a polystyrene-based polymer resin, a fluorine-based polymer resin, a polypropylene-based polymer resin, a polymethyl(meth)acrylate-based polymer resin, a polyimide-based polymer is resin, a polyamide-based polymer resin, a polyethyleneterephthalate-based polymer resin, or a compound thereof, but is not limited thereto.

The pores of the porous medium may have an average diameter of about 0.01 μm to about 10 μm. When an average diameter is less than about 0.01 μm, the diffusion of methanol may not be sufficiently performed, and thus the performance of the fuel cell may deteriorate. When an average diameter is greater than about 10 μm, the balance between methanol supply and consumption may not be sufficiently maintained.

The porosity and tortuosity of the porous medium may be regulated by adjusting the mobility of methanol to between about $0.8 \times 10^{-6}$ g/cm²·sec and about $4 \times 10^{-6}$ g/cm²·sec. Tortuosity indicates a degree of twisting or winding of a flow path through the pores of the porous medium, and can be calculated by dividing the actual distance that a molecule moves between two random points by the distance in straight line between the two points. Therefore, when the tortuosity is 1, the flow path is straight. As tortuosity increases, the winding or twisting of the flow path increases.

A thickness of the porous medium may be between about 0.01 mm and about 10 mm. When the thickness is less than about 0.01 mm, the porous medium may have excessively weak mechanical strength. When the thickness is greater than about 10 mm, the volume of the fuel cell system may be too great.

Figure 2A:
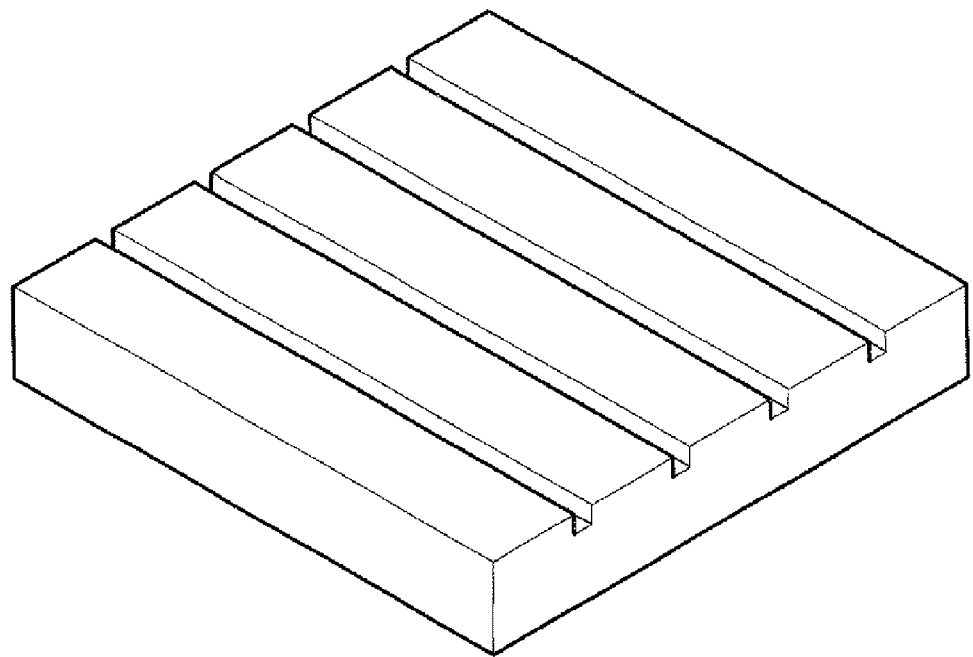
FIG. 2A, FIG. 2B, and FIG. 2C show schematic views of a channel structure formed in a porous medium according to an exemplary embodiment of the present invention.
Figure 2B:
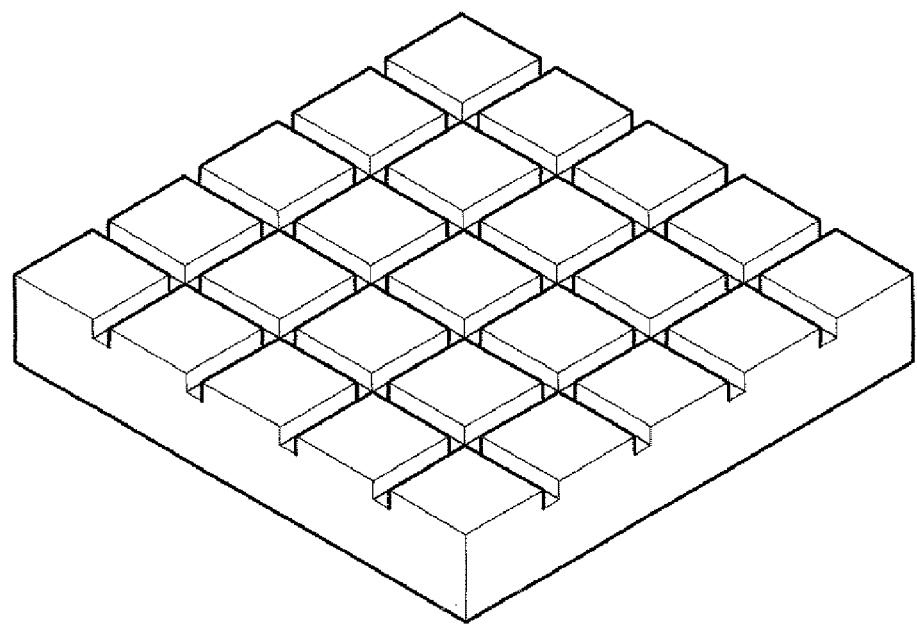
Figure 2C:
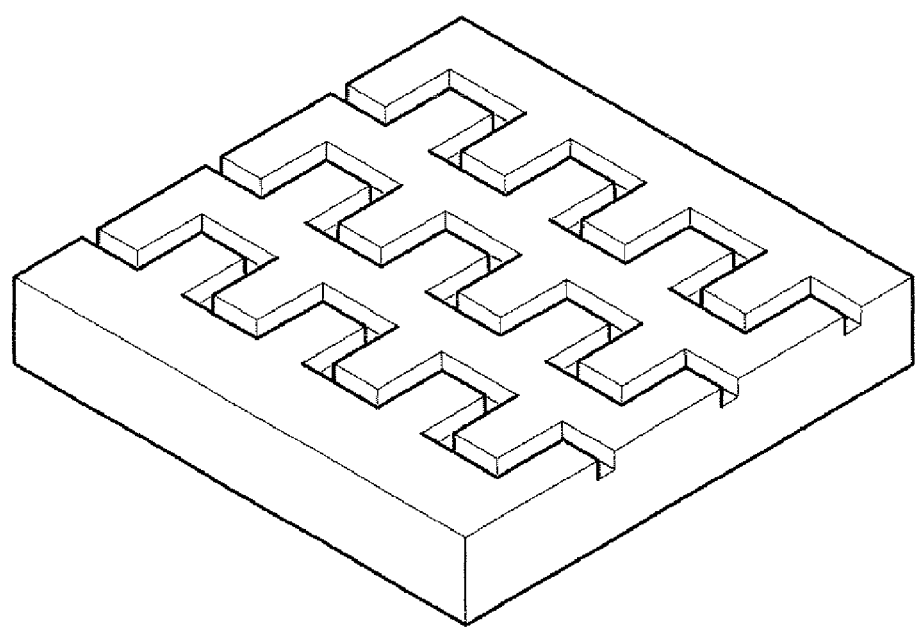

The porous medium may also include a channel for discharging $CO_2$ in a surface that contacts the surface of the anode. The channel may have various shapes and structures according to the size of the fuel cell system, but is not limited. For example, the channel may have one of the shapes illustrated in FIG. 2A, FIG. 2B, and FIG. 2C, but is not limited thereto.

Figure 3:
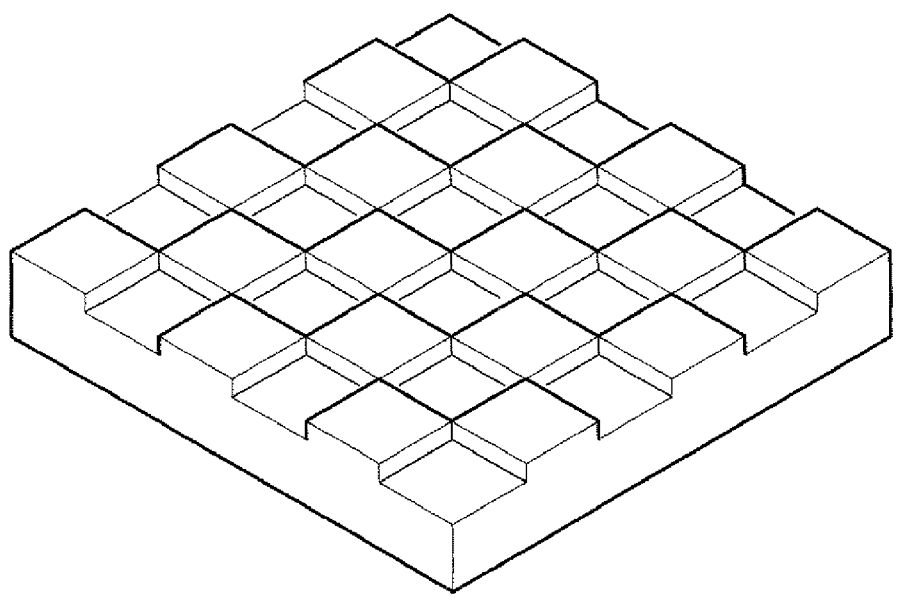
FIG. 3 shows a schematic view of a concave-convex structure formed in a porous medium according to an exemplary embodiment of the present invention.

In addition, the porous medium may have a pattern in a surface that contacts the surface of the first separation layer 30. The pattern may enlarge the effective surface area through which fuel flows from the buffer solution layer 21 and may shorten the fuel-supplied path. The pattern may have a structure in which islands are formed on a surface of the porous medium or may have a concave-convex structure in which a recess is partially formed. For example, the pattern may have a shape as illustrated in FIG. 3, but is not limited thereto.

The operation of the buffer solution layer 21 will now be described.

When the concentration of methanol in the buffer solution layer 21 is low, the amount of methanol supplied to the buffer solution layer 21 through the first separation layer 30 may be greater than the amount of methanol that is transferred from the buffer solution layer 21 to the membrane electrode assembly 10. Therefore, the concentration of methanol in the buffer solution layer 21 increases. Conversely, when the concentration of methanol in the buffer solution layer 21 is high, the amount of methanol that is transferred from the buffer solution layer 21 to the membrane electrode assembly 10 may be greater than the amount of methanol that is supplied to the buffer solution layer 21 through the first separation layer 30 due to active reactions of the membrane electrode assembly 10. Thus, the concentration of methanol in the buffer solution layer 21 decreases. Through such self regulation described above, the concentration of methanol in the buffer solution layer 21 is maintained at about a steady level. Accordingly, the liquid-phase water generated from the cathode and the vapor-phase fuel are mixed such that the methanol maintains a predetermined concentration.

In the low-concentration fuel solution, the concentration of the fuel may be in the range of about 0.5 to about 5.0 M in a normal state. When the concentration of the fuel is less than about 0.5 M, a very long time may be required for the membrane electrode assembly 10 to generate electric power at a predetermined level or greater through the self regulation described is above. When the concentration of the fuel is greater than about 5.0 M, the performance of the fuel cell system may decrease. As described above, such a high concentration of the fuel may include undesirable effects such as rapid poisoning of catalysts or methanol crossover.

A fuel cell may initially operate using water supplied to the buffer solution layer 21 only. However, in order to maintain a constant concentration of methanol in the buffer solution layer 21, water may be supplied to the buffer solution layer 21 in a quantity equal to the amount of water consumed in the reaction occurring in the anode. A method of supplying water to the buffer solution layer 21 is not limited. For example, water generated in a cathode may be collected and recirculated to the buffer solution layer 21 through a water circulation path disposed outside the membrane electrode assembly 10. Alternatively, a hydrophobic membrane (not shown) may be formed in the cathode and water generated in the cathode may diffuse toward the anode through an electrolyte membrane by hydrostatic pressure formed when water generated in the cathode accumulates in the cathode.

Through the method described above, the fuel in the buffer solution layer 21 can be controlled. More particularly, the liquid-phase water that is generated in the cathode may be used to adjust the concentration of methanol to a predetermined level. In addition, the concentration of the fuel can be adjusted according to the output power required by an external load circuit by controlling the amount of water.

The aqueous fuel solution in the buffer solution layer 21 is transferred by capillary pressure to the anode of the membrane electrode assembly 10 that closely contacts the buffer solution layer 21. In order to facilitate the uniform supply of the fuel, a liquid transfer medium 60, as shown in FIG. 9, may be formed between the buffer solution layer 21 and the anode. The liquid transfer medium 60 may be any medium that allows liquid to pass through is more quickly than gas. The liquid transfer medium 60 may be formed in a thin membrane.

The membrane electrode assembly 10 includes two electrodes—a cathode and an anode—and may also include a proton conductive membrane interposed therebetween. Materials, shapes, and producing methods for the proton conductive membrane and the electrodes are not limited. The aqueous fuel solution that has been transferred from the buffer solution layer 21 contacts a catalyst of the anode and generates electric power through the chemical reaction shown in Reaction Scheme 1.

A fuel cell system according to an embodiment of the present invention will be described with reference to FIG. 4 and FIG. 5.

Referring to FIG. 5, the fuel cartridge 40 may have an upper cover 43 in its upper portion to separate the fuel storage layer 41 from the first separation layer 30. The upper cover 43 may have openings 42 to allow the vaporized fuel to be transferred. The upper cover 43 may be a plate with openings or a mesh that can substantially separate the fuel storage layer 41 from the first separation layer 30 physically. However, the upper cover 43 may have any structure such that the vaporized fuel can be transferred to the first separation layer 30, and is not limited to the described structures.

The first separation layer 30 may contact and be attached to the upper cover 43 of the fuel cartridge 40 where the openings 42 are formed. The buffer solution cartridge 20 may contact and be attached to a top surface of the first separation layer 30 contacting the fuel cartridge 40.

In addition, the buffer solution cartridge 20 may house the buffer solution layer 21. A lower portion of the buffer solution cartridge 20 may separate the buffer solution layer 21 from the first separation layer 30. Hence, the lower portion of the buffer solution cartridge 20 is may have openings 22 to transfer the fuel that has passed through the first separation layer 30. The lower portion of the buffer solution cartridge 20 having openings 22 may be a plate having openings or a mesh that substantially separates the buffer solution layer 21 from the first separation layer 30 physically. The lower portion of the buffer solution cartridge 20 may include any structure that allows a fuel passing through the first separation layer 30 to then move to the buffer solution layer 21, and is not limited to the described structures.

As illustrated in FIG. 5, the buffer solution layer 21 may face the membrane electrode assembly 10, and in particular, face an anode of the membrane electrode assembly 10. A cathode of the membrane electrode assembly 10 may be protected using a plate that has air supply openings.

The respective layers that are combined as described above may be bonded together using a coupling means.

A fuel cell system according to another exemplary embodiment of the present invention will be described with reference to FIG. 6.

The fuel cartridge 40 and the first separation layer 30 may be the same as in the previous exemplary embodiment as described above. However, a second separation layer 50 may be formed between the fuel cartridge 40 and the first separation layer 30. The second separation layer 50 may have a similar shape as the first separation layer 30, and together with the first separation layer 30, may control the rate of the fuel supplied to the buffer solution layer 21.

In addition, high-concentration methanol may be diffused in a liquid phase using a porous medium in the fuel storage layer 41 and the second separation layer 50.

The material used to form the second separation layer 50 is not limited, and may is have pores of about 1 μm to about 10 μm in diameter. When the average diameter of the pores of the second separation layer 50 is less than about 1 μm, it may be difficult for the vaporized fuel to pass through the second separation layer 50. Conversely, when the average diameter of the pores of the second separation layer 50 is greater than about 10 μm, it may be difficult to control the rate of fuel supplied.

The buffer solution cartridge 20 may be formed as described in the previous exemplary embodiment, and may include a $CO_2$ vent 23.

The $CO_2$ vent 23 may be formed in a side portion of the buffer solution cartridge 20, and when needed, multiple $CO_2$ vents 23 may be formed. The $CO_2$ vent 23 may be formed in only one side portion or multiple side portions. The $CO_2$ vent 23 may have a diameter formed such that gas-phase $CO_2$ is allowed to pass though, but a liquid-phase buffer solution does not leak. The $CO_2$ vent 23 may have a diameter of about 0.01 mm to about 0.5 mm. It may be difficult to produce a $CO_2$ vent 23 with a diameter less than about 0.01 mm, and the liquid-phase buffer solution may leak if the diameter of the $CO_2$ vent 23 is greater than about 0.5 mm.

Figure 7:
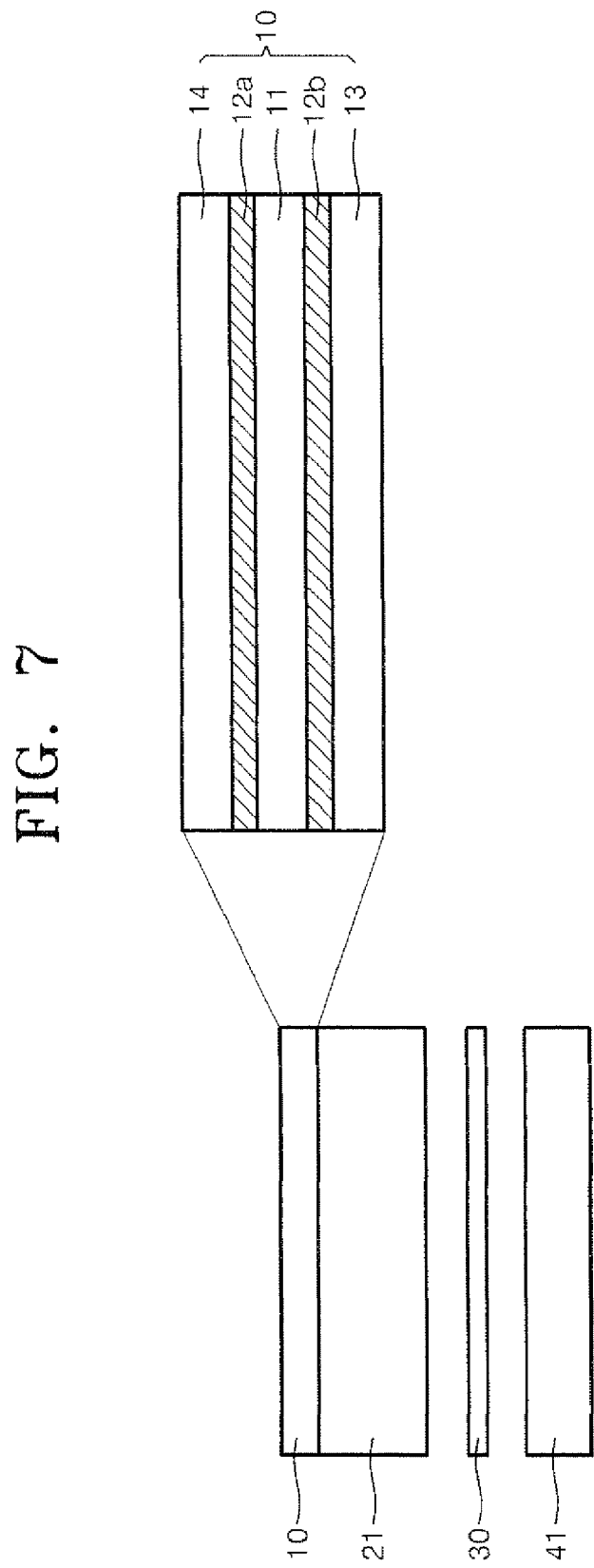
FIG. 7 shows a cross-sectional view of a fuel cell system and a membrane electrode assembly including a current collector according to another exemplary embodiment of the present invention.

In a fuel cell system according to the current exemplary embodiment of the present invention, a current collector may be formed on the respective surfaces of electrodes that do not contact the proton conductive membrane. Alternatively, referring to FIG. 7, in which a fuel cell system according to another exemplary embodiment is illustrated, a current collector 12a may be interposed between a proton conductive membrane 11 and a cathode 14, and current collector 12b may be interposed between a proton conductive membrane 11 and an anode 13. The current collector 12a and current collector 12b each collect a current generated in the electrodes and supply the collected current to an external circuit. A material for forming the current collector is not limited and may be any material that conducts a current and is corrosion-resistant.

The current collector 12a and current collector 12b may be interposed between a proton conductive membrane 11 and an electrode because an electrochemical reaction generating a current most actively occurs between the proton conductive membrane 11 and the electrode. Specifically, the concentration of reactants may be great in this region, and thus it provides the region where the generated current can be most efficiently collected.

A fuel cell system according to the current exemplary embodiments of the present invention have been described to provide fuel using a passive supplying method so that the system is small and unnecessary power consumption does not occur. As a result, the efficiency of the entire system is high. In addition, a pure fuel or an aqueous high-concentration fuel solution is used so that the energy density of the entire system is high. As a result, the fuel cell may provide a small, compact power-supplying source suitable for various uses. Furthermore, a liquid-phase fuel is provided in a vapor state and thus, the fuel can be supplied regardless of the orientation of the entire system. As a result, the fuel cell system can be used in portable power sources.

The present invention will be described in further detail with reference to the following examples. These examples are for illustrative purposes only and are not intended to limit the scope of the present invention.

Example 1

A porous medium where a pure methanol was uniformly distributed was placed in a fuel cartridge and the resulting fuel cartridge was sealed with an upper cover. In this case, a product sold under the trade name Foamex® was used as a porous medium, and an acryl plate is with linear openings of 0.8 mm in width was used as the upper cover.

Then, a second separation layer having pores of 200 nm in diameter was deposited on the sealed fuel cartridge, and then a first separation layer formed of Nafion® 117 was deposited thereon.

Next, a buffer solution cartridge containing a buffer solution was deposited on the first separation layer. In this case, an aqueous 1M methanol solution was used as a buffer solution, and the buffer solution was uniformly distributed in a carbon cloth. The resulting carbon cloth was placed in the buffer solution cartridge. Four $CO_2$ vents each with a diameter of 0.4 mm were formed in four side portions of the buffer solution cartridge. In addition, linear openings of 0.8 mm in width were formed in a lower portion of the buffer solution cartridge to provide a path through which vaporized fuel could pass.

A membrane electrode assembly, prepared using a conventional method known in the art, was deposited on the multi-layer stack of the fuel cartridge, the second separation layer/ the first separation layer, and the buffer solution cartridge prepared above. A proton conductive membrane of the membrane electrode assembly was formed of Nafion® 117, a Pt/Ru alloy catalyst was used as an anode catalyst, and a Pt/Al alloy catalyst was used as a cathode catalyst.

The membrane electrode assembly deposited above was covered with an acryl plate having circular openings of 5 mm in diameter to protect the membrane electrode assembly and to supply air.

Figure 8:
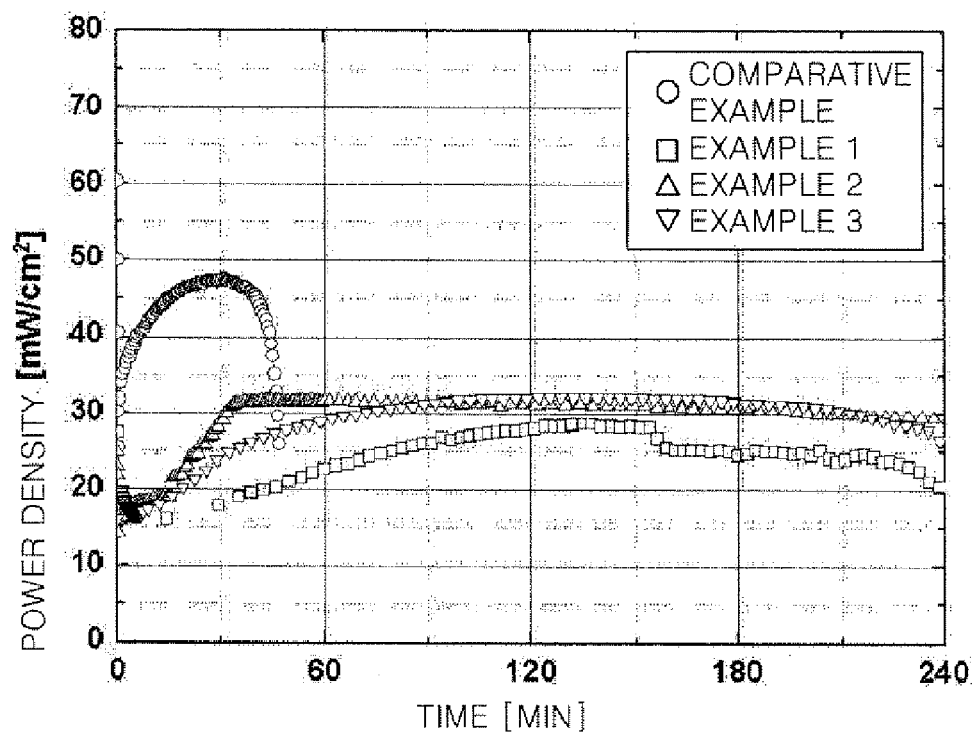
FIG. 8 shows a graph illustrating performance test results of fuel cell systems according to Example 1, Example 2, Example 3 and a Comparative Example.

Electric power density of the fuel cell prepared above was measured with respect to time, and the results are shown in FIG. 8.

Example 2

A fuel cell was produced in the same manner as in Example 1 except that an aqueous 3M-methanol solution was used as the buffer solution.

Electric power density of the fuel cell prepared above was measured with respect to time, and the results are shown in FIG. 8.

Example 3

A fuel cell was produced in the same manner as in Example 1 except that a laminate formed by laminating Nafion® 112 with a porous layer of 45 μm-thick Teflon® with a vapor permeability of 5500 $g/m^2/24$ hr, was used as the first separation layer.

An electric power density of the fuel cell prepared above was measured with respect to time, and the results are shown in FIG. 8.

Comparative Example

A fuel cell system was prepared in a similar manner as the above described Examples, except an anode of the membrane electrode assembly directly contacted an aqueous methanol solution as described below.

First, the anode of the membrane electrode assembly was oriented upward, and a cathode was covered with an acryl plate having circular openings of 5 mm in diameter to protect the membrane electrode assembly and to supply air. Then, a fuel cartridge containing an aqueous 3 M methanol solution directly contacted an upper portion of the anode, so that the aqueous methanol solution was directly supplied to the anode. In this case, the fuel cartridge did not have the upper cover.

Electric power density of each fuel cell prepared above was measured in $mW/cm^2$ with respect to time, and the results are shown in FIG. 8.

Referring to FIG. 8, the fuel cell prepared according to Comparative Example is exhibited higher electric power density than the fuel cells according to Examples 1 through 3 during an initial operation. However, the electric power density of the fuel cell according to Comparative Example dramatically decreased over time. For example, when the fuel cell operated for one hour, the electric power density of the Comparative Example decreased significantly.

During the initial operation, a high concentration of methanol was smoothly supplied in the Comparative Example so that chemical reactions could actively occur. Accordingly, as the temperature of the membrane electrode assembly increased, the electric power density increased. However, the electric power density of the fuel cell suddenly decreased because the membrane electrode assembly was poisoned, the concentration of water provided to the anode decreased, and efficiency decreased due to the crossover of methanol.

However, even though fuel cells according to Example 1, Example 2, and Example 3 exhibited lower electric power density than the fuel cell according to Comparative Example during an initial operation, they provided a substantially constant electric power density over an extended period of use. When the fuel cell system began operation, the temperature of the membrane-electrode assembly increased as the reaction proceeded, the speed of the reaction increased, and the electric power density also increased. Thereafter, the heat generation due to the exothermic reaction was balanced with the cooling rate, and the methanol supply was self regulated. As a result, substantially constant electric power density was obtained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fuel cell system, comprising:
    a membrane electrode assembly comprising a cathode, a proton conductive membrane, and an anode;
    a buffer solution layer facing a surface of the anode and containing liquid-phase water generated in the cathode and a vapor-phase fuel;
    a first separation layer facing a surface of the buffer solution layer; and
    a fuel storage layer facing a first surface of the first separation layer,
    wherein the first separation layer allows fuel to pass through more quickly than water, and allows gas to pass through more quickly than liquid,
    wherein the buffer solution layer comprises a porous medium and a buffer solution uniformly distributed in the porous medium, and
    wherein a surface of the porous medium that contacts the surface of the anode has a channel for discharging $CO_2$.

2. The fuel cell system of claim 1, wherein the buffer solution layer contains the fuel in a concentration that is controllable.

3. The fuel cell system of claim 1, wherein an amount of the liquid-phase water contained in the buffer solution layer is controlled by a demand for electric power output from the fuel cell system.

4. The fuel cell system of claim 1, wherein the buffer solution layer is separated from the first separation layer.

5. The fuel cell system of claim 1, wherein the first separation layer is separated from the fuel storage layer.

6. The fuel cell system of claim 1, wherein the porous medium is hydrophilic.

7. The fuel cell system of claim 1, wherein the porous medium is selected from the group consisting of an inorganic oxide material, a polymer material and a compound thereof.

8. The fuel cell system of claim 7, wherein the inorganic oxide material is selected from the group consisting of silica ($SiO_2$), alumina ($Al_2O_3$), titania ($TiO_2$), zirconia ($ZrO_2$), and a compound thereof.

9. The fuel cell system of claim 7, wherein the polymer material is selected from the group consisting of a polymer resin comprising a hydroxyl group, a carboxyl group, an amine group or a sulfone group; a polyvinylalcohol-based polymer resin; a cellulose-based polymer resin; a polyvinylamine-based polymer resin; a polyethylene oxide-based polymer resin; a polyethyleneglycol-based polymer resin; a nylon-based polymer resin; a polyacrylate-based polymer resin; a polyester-based polymer resin; a polyvinylpyrrolidone-based polymer resin; an ethylenevinylacetate-based polymer resin; a polyethylene-based polymer resin; a polystyrene-based polymer resin; a fluorine-based polymer resin; a polypropylene-based polymer resin; a polymethyl(meth)acrylate-based polymer resin; a polyimide-based polymer resin; a polyamide-based polymer resin; a polyethyleneterephthalate-based polymer resin; and a compound thereof.

10. The fuel cell system of claim 1, wherein pores of the porous medium have an average diameter of 0.01 μm to 10 μm.

11. The fuel cell system of claim 1, wherein porosity and tortuosity of the porous medium is regulated by adjusting the mobility of fuel to $0.8 \times 10^{-6}$ $g/cm^2 \cdot sec$ to $4 \times 10^{-6}$ $g/cm^2 \cdot sec$.

12. The fuel cell system of claim 1, wherein a thickness of the porous medium is 0.01 mm to 10 mm.

13. The fuel cell system of claim 1, wherein pores of the first separation layer have a diameter of 0.001 μm to 50 μm.

14. The fuel cell system of claim 1, wherein a thickness of the first separation layer is 1 μm to 500 μm.

15. The fuel cell system of claim 1, wherein a diffusion coefficient of fuel through the first separation layer is at least three times greater than a diffusion coefficient of water through the first separation layer.

16. The fuel cell system of claim 1, wherein the fuel storage layer comprises a porous medium and the fuel uniformly distributed in the porous medium.

17. The fuel cell system of claim 1, wherein the fuel storage layer is housed in a fuel cartridge that faces the first surface of the first separation layer.

18. The fuel cell system of claim 17, further comprising a liquid transferring medium interposed between the fuel cartridge and the first separation layer.

19. The fuel cell system of claim 17, wherein the fuel cartridge has openings in a surface that contacts the surface of the first separation layer.

20. The fuel cell system of claim 1, further comprising a second separation layer interposed between the first separation layer and the fuel storage layer.

21. The fuel cell system of claim 1, wherein the fuel is methanol.

22. The fuel cell system of claim 21, wherein a concentration of methanol in the buffer solution layer is 0.5 M to 5 M.

23. The fuel cell system of claim 21, wherein fuel contained in the fuel storage layer is pure methanol or a high concentration methanol with a concentration of 5 M or greater.

24. The fuel cell system of claim 1, wherein a cathode current collector is arranged between the cathode and the proton conductive membrane and an anode current collector is arranged between the anode and the proton conductive membrane.

25. A fuel cell system, comprising:
a membrane electrode assembly comprising a cathode, a proton conductive membrane, and an anode;
a buffer solution layer facing a surface of the anode and containing liquid-phase water generated in the cathode and a vapor-phase fuel;
a first separation layer facing a surface of the buffer solution layer; and
a fuel storage layer facing a first surface of the first separation layer,
wherein the first separation layer allows fuel to pass through more quickly than water, and allows gas to pass through more quickly than liquid,
wherein the buffer solution layer comprises a porous medium and a buffer solution uniformly distributed in the porous medium, and
wherein a diametric distribution of pores of the porous medium is bimodal.

26. The fuel cell system of claim 25, wherein a first peak of the bimodal distribution is 1 nm to 10 μm and a second peak of the bimodal distribution is 10 μm to 10 mm.

27. A fuel cell system, comprising:
a membrane electrode assembly comprising a cathode, a proton conductive membrane, and an anode;
a buffer solution layer facing a surface of the anode and containing liquid-phase water generated in the cathode and a vapor-phase fuel;
a first separation layer facing a surface of the buffer solution layer; and
a fuel storage layer facing a first surface of the first separation layer,
wherein the first separation layer allows fuel to pass through more quickly than water, and allows gas to pass through more quickly than liquid,
wherein the buffer solution layer comprises a porous medium and a buffer solution uniformly distributed in the porous medium, and
wherein a surface of the porous medium that contacts a second surface of the first separation layer has a pattern formed therein.

28. A fuel cell system, comprising:
a membrane electrode assembly comprising a cathode, a proton conductive membrane, and an anode;
a buffer solution layer facing a surface of the anode and containing liquid-phase water generated in the cathode and a vapor-phase fuel;
a first separation layer facing a surface of the buffer solution layer; and
a fuel storage layer facing a first surface of the first separation layer,
wherein the first separation layer allows fuel to pass through more quickly than water, and allows gas to pass through more quickly than liquid, and
wherein the buffer solution layer is housed in a buffer solution cartridge,
an upper portion of the buffer solution cartridge is completely open such that an upper surface of the buffer solution layer contacts the surface of the anode, and
a lower portion of the buffer solution cartridge faces a second surface of the first separation layer.

29. The fuel cell system of claim 28, further comprising a liquid transferring medium interposed between the buffer solution layer and the anode.

30. The fuel cell system of claim 28, wherein the buffer solution cartridge comprises a $CO_2$ vent.

31. The fuel cell system of claim 28, wherein a lower portion of the buffer solution cartridge comprises an opening therein.

32. A fuel cell system, comprising:
a membrane electrode assembly comprising a cathode, a proton conductive membrane, and an anode;
a buffer solution layer facing a surface of the anode and containing liquid-phase water generated in the cathode and a vapor-phase fuel;
a first separation layer facing a surface of the buffer solution layer; and
a fuel storage layer facing a first surface of the first separation layer,
wherein the first separation layer allows fuel to pass through more quickly than water, and allows gas to pass through more quickly than liquid,
wherein pores of the first separation layer have a diameter of 0.001 μm to 50 μm, and
wherein a diametric distribution of pores of the first separation layer is bimodal, and a first peak of the bimodal distribution is 0.001 μm to 0.05 μm and a second peak of the bimodal distribution is 1 μm to 50 μm.

33. A fuel cell system, comprising:
a membrane electrode assembly comprising a cathode, a proton conductive membrane, and an anode;
a buffer solution layer facing a surface of the anode and containing liquid-phase water generated in the cathode and a vapor-phase fuel;
a first separation layer facing a surface of the buffer solution layer; and
a fuel storage layer facing a first surface of the first separation layer,
wherein the first separation layer allows fuel to pass through more quickly than water, and allows gas to pass through more quickly than liquid, and
wherein the first separation layer comprises a laminate including at least two porous layers having different average pore sizes.

* * * * *